(12) United States Patent
Wu

(10) Patent No.: US 10,945,384 B2
(45) Date of Patent: Mar. 16, 2021

(54) BLOWING-SUCTION MACHINE

(71) Applicant: Ningbo Daye Power Machinery Co., Ltd., Zhejiang (CN)

(72) Inventor: Zhiqiang Wu, Zhejiang (CN)

(73) Assignee: NINGBO DAYE POWER MACHINERY CO., LTD., Zhejiang (CN)

( * ) Notice: Subject to any disclaimer, the term of this patent is extended or adjusted under 35 U.S.C. 154(b) by 269 days.

(21) Appl. No.: 15/966,767

(22) Filed: Apr. 30, 2018

(65) Prior Publication Data
US 2019/0289798 A1    Sep. 26, 2019

(30) Foreign Application Priority Data

Mar. 22, 2018 (CN) .......................... 201810238527.6
Mar. 22, 2018 (CN) .......................... 201820391310.4

(51) Int. Cl.
| | | |
|---|---|---|
| *A01G 20/47* | (2018.01) | |
| *A01D 69/06* | (2006.01) | |
| *A47L 9/04* | (2006.01) | |
| *E01H 1/08* | (2006.01) | |
| *A47L 5/14* | (2006.01) | |
| *E01H 5/04* | (2006.01) | |
| *E01H 5/09* | (2006.01) | |

(52) U.S. Cl.
CPC ............. *A01G 20/47* (2018.02); *A01D 69/06* (2013.01); *A47L 5/14* (2013.01); *A47L 9/0444* (2013.01); *A47L 9/0477* (2013.01); *E01H 1/0818* (2013.01); *E01H 1/0845* (2013.01); *E01H 1/0872* (2013.01); *E01H 5/045* (2013.01); *E01H 5/092* (2013.01); *E01H 5/098* (2013.01)

(58) Field of Classification Search
CPC ........ A01G 20/47; A01G 20/43; A01D 69/00; A01D 69/06; A01D 69/08; A47L 9/0427; A47L 9/0444; A47L 9/0422; A47L 9/0477
See application file for complete search history.

(56) References Cited

U.S. PATENT DOCUMENTS 1,129,174 A * 2/1915 Dennis ...................... A47L 5/10
 15/342
2,270,646 A * 1/1942 Campbell .............. A01D 34/02
 56/14.4

(Continued)

*Primary Examiner* — Bryan R Muller
(74) *Attorney, Agent, or Firm* — McDonnell Boehnen Hulbert & Berghoff LLP

(57) ABSTRACT

A blowing-suction machine includes an engine, a volute, a vent assembly and a vacuum pipe. The engine is installed at an upper end of the volute; the vent assembly is installed at a front end of the volute; an output shaft of the engine in the volute is coupled to a vane; a first shaft of a self-propelled device is coupled to a lower end of the first shaft; both ends of a second shaft of the self-propelled device are coupled to a wheel self-propelled device and a rolling-sweeping-combing device respectively; and the vacuum pipe has an end coupled to the vent assembly and the other end disposed in front of a garbage deposit box. This disclosure features a simple structure and a clever design and provides the self-propelled, automatic sweeping, automatic grass combing, and garbage crushing functions to improve the blowing-suction rate significantly and provide a convenient use.

8 Claims, 10 Drawing Sheets

(56) References Cited

U.S. PATENT DOCUMENTS

| | | | | |
|---|---|---|---|---|
| 2,809,389 A * | 10/1957 | Collins | ............... | A01G 20/43 |
| | | | | 56/501 |
| 3,218,876 A * | 11/1965 | Berger | ............... | A01D 34/63 |
| | | | | 476/9 |
| 3,783,592 A * | 1/1974 | Schraut | ............... | A01D 34/62 |
| | | | | 56/13.3 |
| 3,813,725 A * | 6/1974 | Rinker | ............... | A01G 20/47 |
| | | | | 15/347 |
| 4,347,643 A * | 9/1982 | Bair, III | ............... | A47L 5/30 |
| | | | | 15/340.2 |
| 4,446,679 A * | 5/1984 | Thomas | ............... | A01D 42/00 |
| | | | | 37/243 |
| 5,537,807 A * | 7/1996 | Gearing | ............... | A01D 34/005 |
| | | | | 241/101.2 |
| 10,039,229 B2 * | 8/2018 | Wadzinski | ............... | A01D 34/824 |
| 2020/0253114 A1 * | 8/2020 | Yan | ............... | A01D 34/6812 |

\* cited by examiner

BLOWING-SUCTION MACHINE

FIELD OF INVENTION

The present disclosure relates to the field of gardening equipment, in particular to a blowing-suction machine.

BACKGROUND OF INVENTION

Description of the Related Art

A blowing-suction machine may be used for outdoor cleaning of a place such as a golf court, a sports field, or a road and it is capable of performing a high efficiency cleaning of garbage such as dead leaves, sand, or snow, urban landscaping, highway, lawn/garden, agricultural orchards, streets, hospitals, schools, villa districts, and lawns, as well as cleaning dust and debris. However, the blowing-suction operation of a conventional blowing-suction machine is generally driven manually and unable to achieve a self-propelled effect, so that the blowing-suction effect is poor, and conventional blowing-suction machine cannot separate the garbage, walk on a lawn, clean dead leaves in a bush, or achieve a clean suction. Obviously, its operation is very inconvenient.

SUMMARY OF THE INVENTION

Problem to be Solved

This disclosure provides a blowing-suction machine to overcome the drawbacks of a conventional blowing-suction machine including its manual blowing-suction operation, no self-propelled effect, poor blowing-suction effect, and failures of walking on a lawn, separating garbage such as the dead leaves in a bush, and a very inconvenient operation.

Technical Solution

To overcome the aforementioned shortcomings of the prior art, this disclosure provides a blowing-suction machine comprising an engine, a volute, a vent assembly, and a vacuum pipe, wherein
the engine is installed at an upper end of the volute; the vent assembly is installed at a front end of the volute; an output shaft of the engine in the volute is coupled to a vane, and a first shaft of a self-propelled device is coupled to a lower end of the vane, and both ends of a second shaft of the self-propelled device are coupled to a wheel self-propelled device and a rolling-sweeping-combing device respectively; the vacuum pipe has an end coupled to the vent assembly and the other end disposed in front of a garbage deposit box; both sides of the volute have a first wheel, a second wheel, a third wheel and a fourth wheel, and the first wheel and the second wheel are installed at a rear end of the volute, and the third wheel and the fourth wheel are installed at a front end of the volute; the wheel self-propelled device comprises a first shaft, a trigger, a transmission gearbox, a sixth shaft, a first pulley, a first belt, a second pulley, a first connecting plate, a second shaft and a first connecting rod, wherein a shaft of the engine is coupled to the first shaft; the trigger has an end coupled to a lift-up handle through a steel wire and the other end coupled to the transmission gearbox; the sixth shaft is configured to be corresponsive to the transmission gearbox, and an end of the sixth shaft is fixed to the first pulley; both ends of the first belt are configured to be corresponsive to the first pulley and the second pulley respectively; ends of the two first connecting plates are rotatably coupled to the first wheel and the second wheel respectively; the first connecting rod is fixed and coupled to the two first connecting plates; the second pulley and the second shaft are rotated synchronously; both ends of the second shaft passing through the first connecting plate are fixed to a first gear and a first bearing respectively, and the first wheel and the second wheel have an inner gear installed therein and engaged with the first gear.

Preferably, the rolling-sweeping-combing device comprises a first chain wheel, a chain, a second connecting plate, a second chain wheel, a third shaft, a third pulley, a second belt, a fourth pulley, a fourth shaft, a rotary brush body and a second connecting rod, wherein the second connecting plate comes with a quantity of two, and ends of the two second connecting plates are respectively and rotatably coupled to the third wheel and the fourth wheel; the second connecting rod is fixed and coupled to the two second connecting plates; the other end of the sixth shaft is fixed to the first chain wheel; the chain has an end coupled to the first chain wheel and the other end coupled to the second chain wheel; the third shaft has an end fixed to the second chain wheel and the other end fixed to the third pulley; the second belt has an end configured to be corresponsive to the third pulley and the other end configured to be corresponsive to the fourth pulley; the fourth shaft has an end fixed to the fourth pulley and the other end fixed to the rotary brush body, and both ends of the fourth shaft are respectively and rotatably coupled to the vent assembly, so that the rotary brush body can rotate in the vent assembly.

Preferably, the rotary brush body comprises a plurality of brush devices, and the brush devices are installed onto the fourth shaft in a mutual coordination manner, and the brush device comprises a fixed seat, a brush seat, a brush and a steel wire, and the brush is fixed onto the brush seat, and the brush seat is plugged into a guide post of the fixed seat, and the steel wire is also inserted into the guide post, and a groove is formed on a side of the fixed seat, and a projection is disposed on the other side of the fixed seat and configured to be corresponsive to the groove.

Preferably, the fourth shaft further has a quick release structure, and the quick release structure comprises a locking buckle, a connection base, a push button and a torsion spring; an upper end of the connection base is fixed to the vent assembly, and the locking buckle is hinged and installed to the connection base, and the push button and the torsion spring are installed to the other end of the connection base by hinge connection; an end of the locking buckle is configured to be corresponsive to the push button; and a second bearing is installed between the locking buckle and the connection base and configured to be corresponsive to the fourth shaft.

Preferably, the transmission gearbox comprises a housing, a fifth shaft, turning plate, a rotating seat, a restoring spring and a second gear, and a lower end of the trigger is fixed to the fifth shaft, and the turning plate is fixed onto the fifth shaft, and the other end of the turning plate is attached to the rotating seat, and the restoring spring is installed to the sixth shaft, and the restoring spring has an end attached to the second gear and the other end configured to be corresponsive to the rotating seat, and the rotating seat and the sixth shaft are fixed and rotated synchronously; the second gear is configured with a gap corresponsive to the sixth shaft; a lower end of the first shaft has a helical teeth portion, and a first gear and a second gear disposed at both upper and lower ends of the helical teeth portion respectively, and the helical teeth portion is engaged with the second gear.

Preferably, the vane and the first shaft are coaxially disposed at an upper end of the first shaft, and the vane and the wheel self-propelled device are sealed and separated by a separator.

Preferably, the vane has a plurality of saw teeth disposed at a lower end of the vane.

Beneficial Effects

The blowing-suction machine of this disclosure features a simple structure and a clever design to provide the self-propelled effect and the automatic sweeping, combing, and crushing functions to achieve mechanization and provide a convenient use.

DESCRIPTION OF THE EMBODIMENTS

Figure 1:
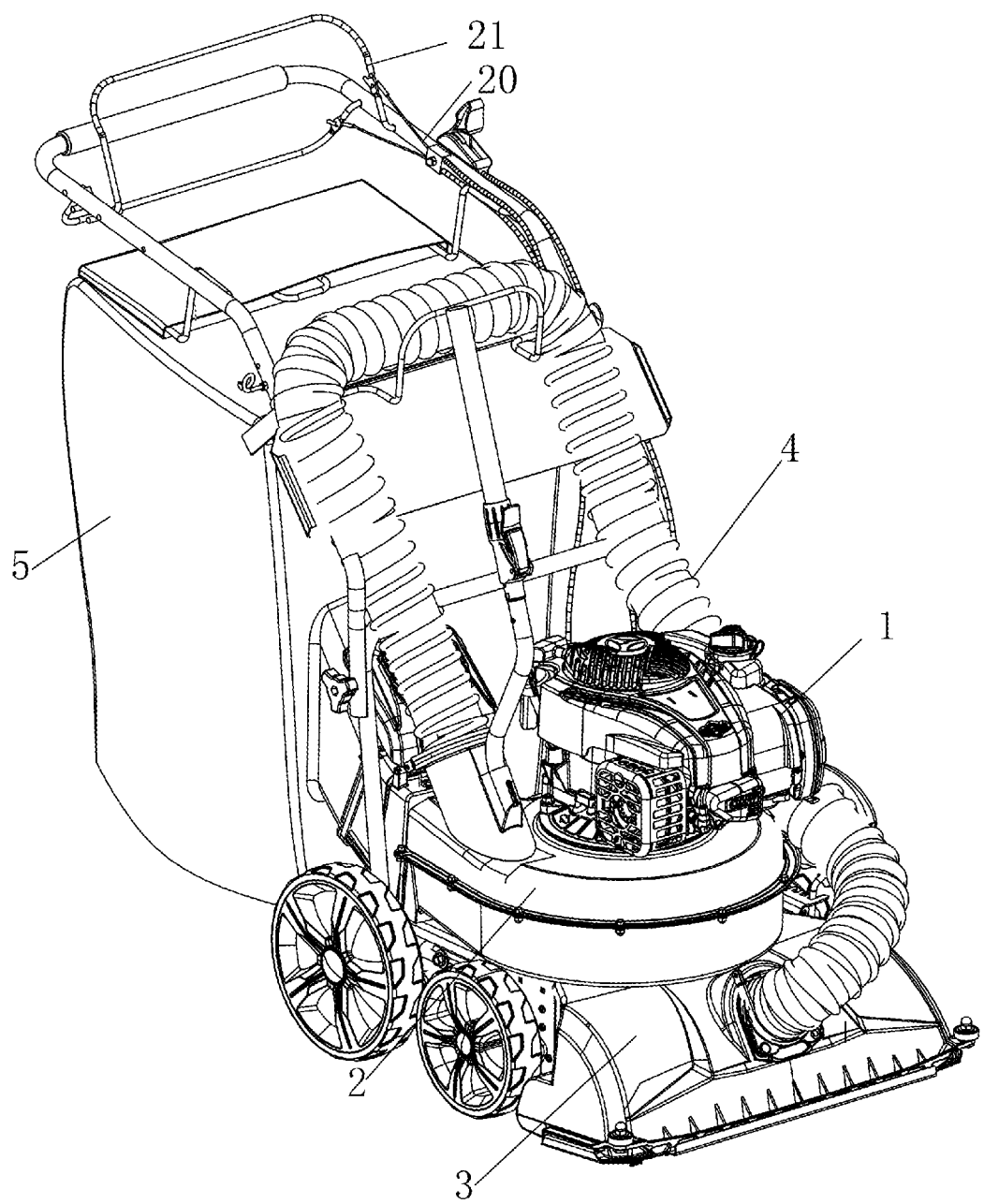
FIG. 1 is a schematic view of a blowing-suction machine of this disclosure.

To understand the technical characteristics of this disclosure intuitively and comprehensively, exemplary embodiments are used and illustrated in referenced figures of the drawings. It is intended that the embodiments and figures disclosed herein are to be considered illustrative rather than restrictive.

With reference to FIGS. 1 to 4 for a blowing-suction machine of this disclosure, the blowing-suction machine comprises an engine 1, a volute 2, a vent assembly 3 and a vacuum pipe 4, characterized in that is installed at an upper end of the volute 2; the vent assembly 3 is installed at a front end of the volute 2; an output shaft of the engine 1 in the volute 2 is coupled to a vane 46, and a first shaft 10 of a self-propelled device is coupled to a lower end of the vane 46, and both ends of a second shaft 18 of the self-propelled device are coupled to a wheel self-propelled device and a rolling-sweeping-combing device respectively; the vacuum pipe 4 has an end coupled to the vent assembly 3 and the other end disposed in front of a garbage deposit box 5; both sides of the volute 2 have a first wheel 6, a second wheel 7, a third wheel 8 and a fourth wheel 9, and the first wheel 6 and the second wheel 7 are installed at a rear end of the volute 2, and the third wheel 8 and the fourth wheel 9 are installed at a front end of the volute 2; the wheel self-propelled device comprises a first shaft 10, a trigger 11, a transmission gearbox 12, a sixth shaft 13, a first pulley 14, a first belt 15, a second pulley 16, a first connecting plate 17, a second shaft 18 and a first connecting rod 19, wherein a shaft of the engine 1 is coupled to the first shaft 10; the trigger 11 has an end coupled to a lift-up handle 21 through a steel wire 20 and the other end coupled to the transmission gearbox 12; the sixth shaft 13 is configured to be corresponsive to the transmission gearbox 12, and an end of the sixth shaft 13 is fixed to the first pulley 14; both ends of the first belt 15 are configured to be corresponsive to the first pulley 14 and the second pulley 16 respectively; ends of the two first connecting plates 17 are rotatably coupled to the first wheel 6 and the second wheel 7 respectively; the first connecting rod 19 is fixed and coupled to the two first connecting plates 17; the second pulley 16 and the second shaft 18 are rotated synchronously; both ends of the second shaft 18 passing through the first connecting plate 17 are fixed to a first gear 22 and a first bearing 23 respectively, and the first wheel 6 and the second wheel 7 have an inner gear 24 installed therein and engaged with the first gear 22.

Figure 2:
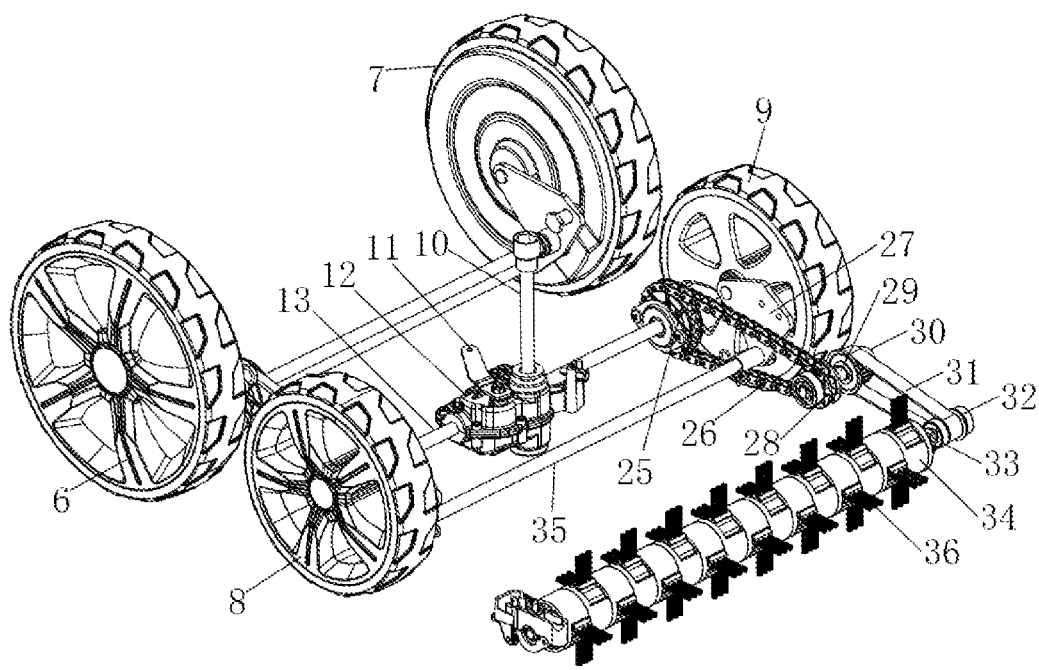
FIG. 2 is a schematic view of a wheel self-propelled device and a rolling-sweeping-combing device of this disclosure.
Figure 3:
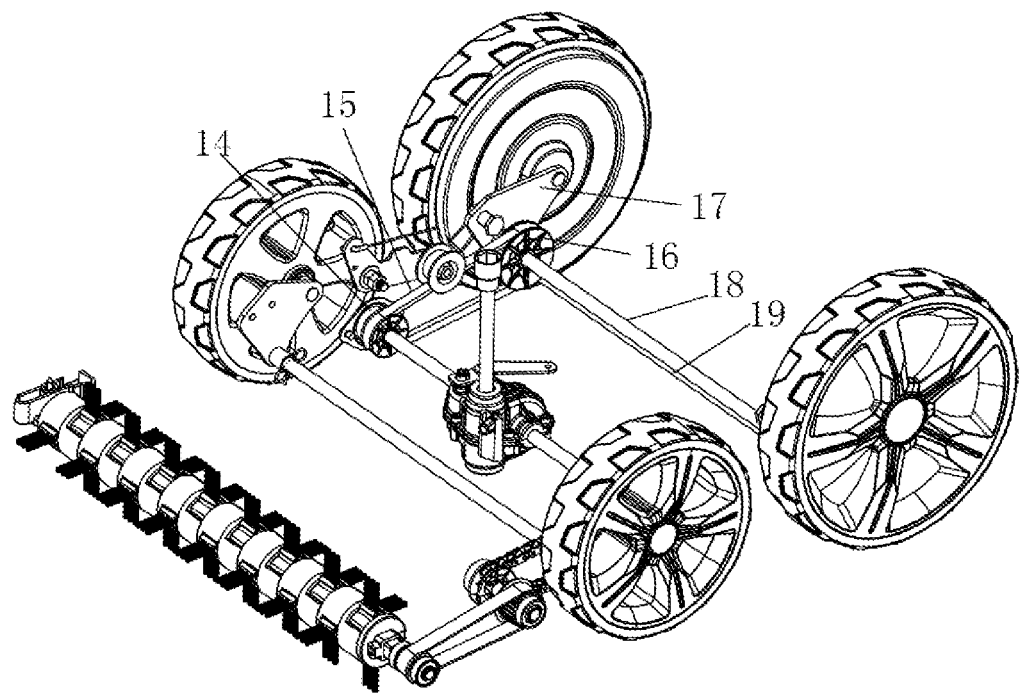
FIG. 3 is another schematic view of a wheel self-propelled device and a rolling-sweeping-combing device of this disclosure.
Figure 4:
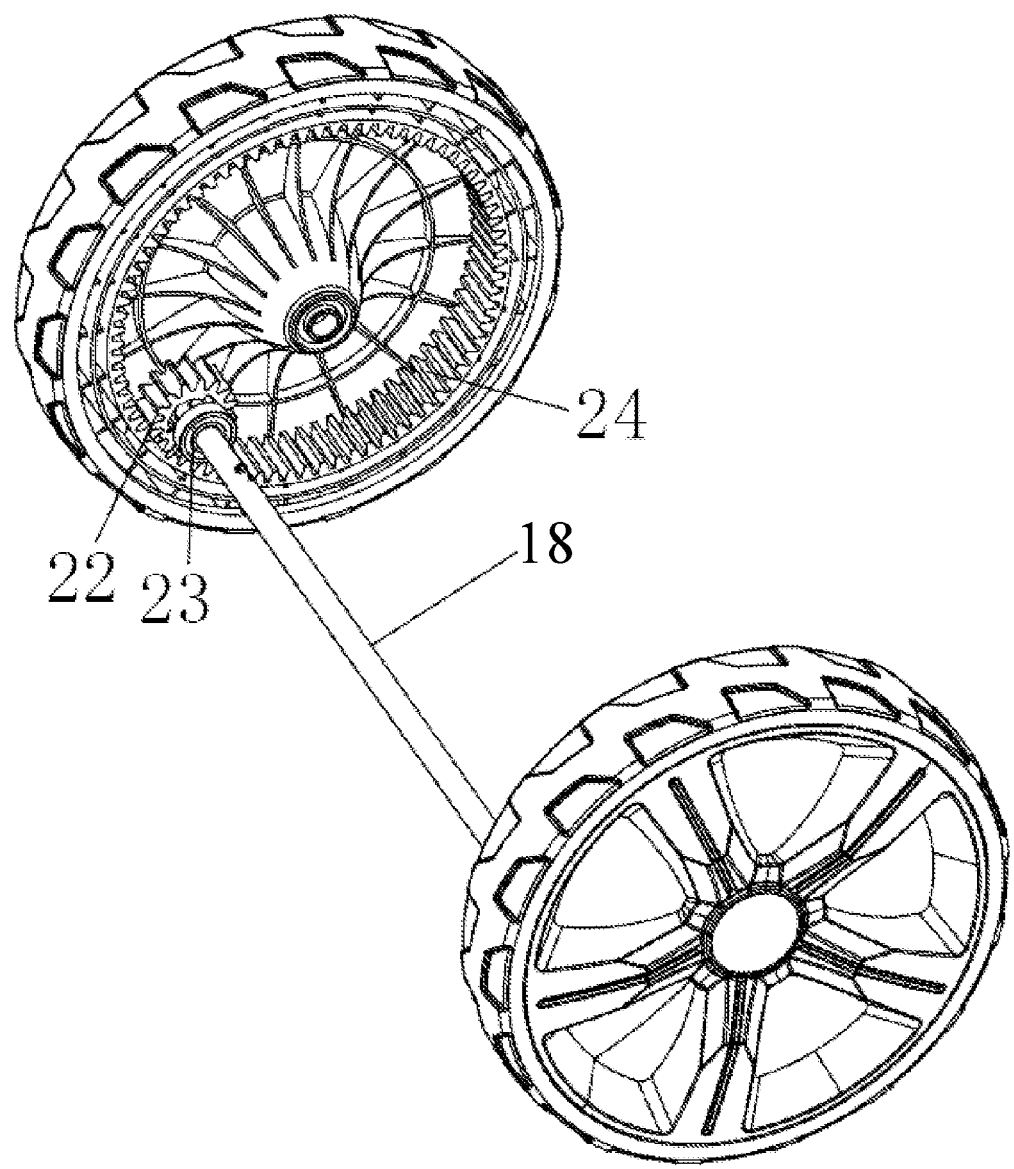
FIG. 4 is a schematic view showing the internal structure of a first wheel and a second wheel of this disclosure.

In FIG. 2, the rolling-sweeping-combing device comprises a first chain wheel 25, a chain 26, a second connecting plate 27, a second chain wheel 28, a third shaft 29, a third pulley 30, a second belt 31, a fourth pulley 32, a fourth shaft 33, a rotary brush body 34 and a second connecting rod 35; the second connecting plate 27 comes with a quantity of two, and ends of the two second connecting plates 27 are respectively and rotatably coupled to the third wheel 8 and the fourth wheel 9; the second connecting rod 35 is fixed and coupled to the two second connecting plates 27; the other end of the sixth shaft 13 is fixed to the first chain wheel 25; the chain 26 has an end coupled to the first chain wheel 25 and the other end coupled to the second chain wheel 28; the third shaft 29 has an end fixed to the second chain wheel 28 and the other end fixed to the third pulley 30; the second belt 31 has an end configured to be corresponsive to the third pulley 30 and the other end configured to be corresponsive to the fourth pulley 32; the fourth shaft 33 has an end fixed to the fourth pulley 32 and the other end fixed to the rotary brush body 34; both ends of the fourth shaft 33 are rotatably coupled to the vent assembly 3, so that the rotary brush body 34 can rotate in the vent assembly 3. The chain 26, the first chain wheel 25 and the second chain wheel 28 may be substituted by a belt and a pulley.

In FIGS. 2, 7, 8 and 9, the rotary brush body 34 comprises a plurality of brush devices installed onto the fourth shaft 33 in a mutual coordination manner, and the brush device comprises a fixed seat 47, a brush seat 48 and a brush 36, and the brush 36 is fixed onto the brush seat 48, and the brush seat 48 is plugged into a guide post 50 of the fixed seat 47, and a groove 51 is formed on a side of the fixed seat 47 and a projection 52 disposed on the other side of the fixed seat 47 and configured to be corresponsive to the groove 51. The brush 36 plays the role of sweeping and cleaning the ground.

Figure 11:
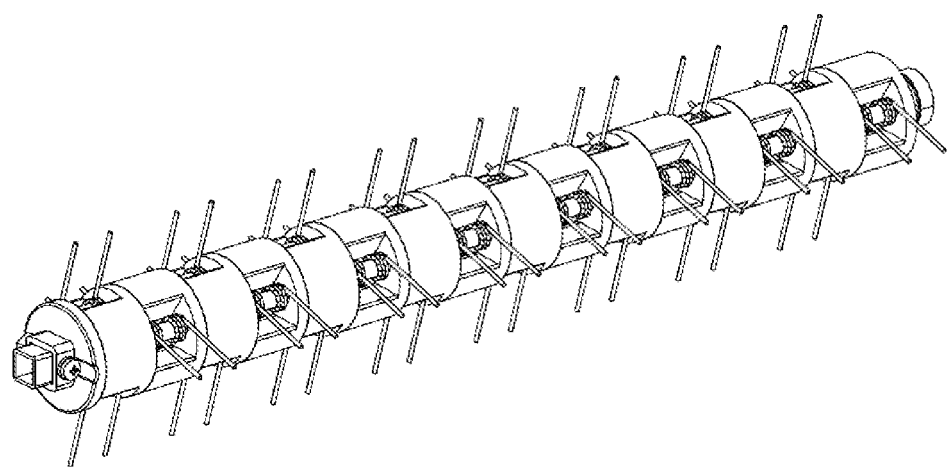
FIG. 11 is a schematic view of another brush device of this disclosure.
Figure 12:
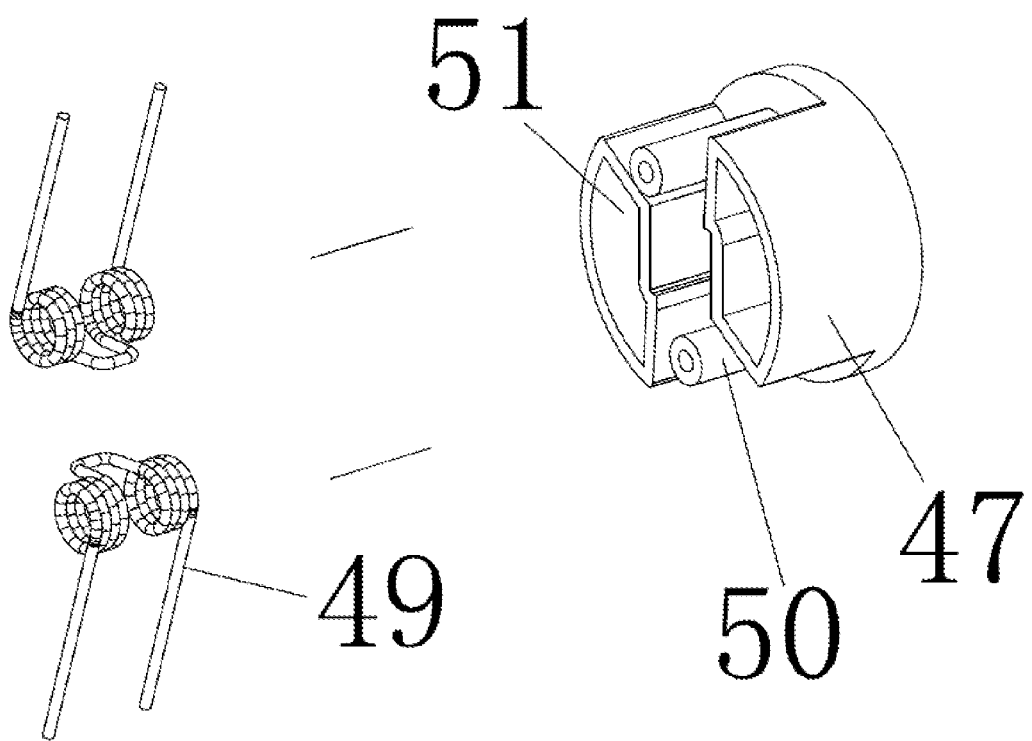
FIG. 12 is an exploded view of another brush device of this disclosure.

In FIGS. 11 and 12, the rotary brush body 34 comprises a plurality of another type of brush devices, and the brush devices installed onto the fourth shaft 33 in a mutual coordination manner, and the brush device comprises a fixed seat 47 and a steel wire 49, and the steel wire 49 is inserted into the guide post 50 of the fixed seat 47, and a groove 51 is formed on a side of the fixed seat 47 and a projection 52 is disposed on the other side of the fixed seat 47 and configured to be corresponsive to the groove 51. The steel wire 49 plays the role of combing a lawn and separating garbage such as the dead leaves tangled in a bush.

Figure 10:
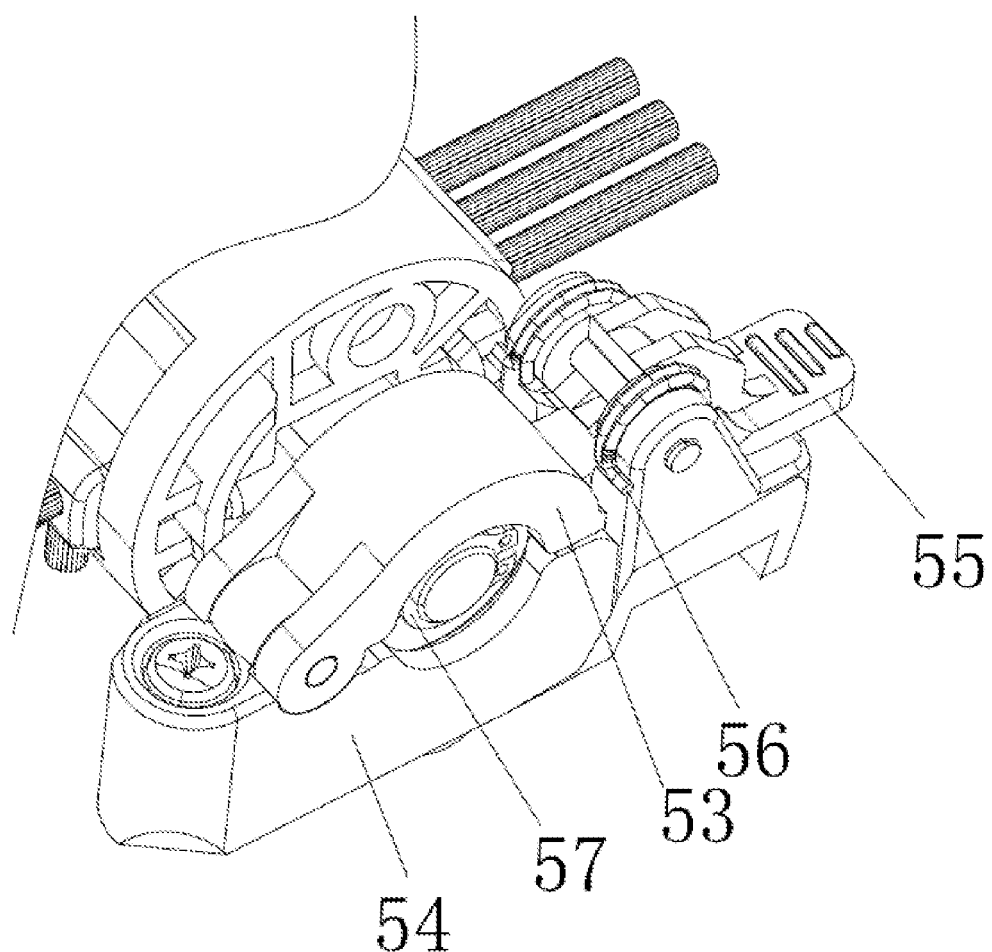
FIG. 10 is a schematic view of a quick release structure of this disclosure.

In FIG. 10, the fourth shaft 33 further has a quick release structure disposed on a side of the fourth shaft 33, and the quick release structure comprises a locking buckle 53, a connection base 54, a push button 55 and a torsion spring 56; an upper end of the connection base 54 is fixed to the vent assembly 3 by screws, and the locking buckle 53 is hinged and installed to the connection base 54, and the push button 55 and the torsion spring 56 are installed to the other end of the connection base 54 by hinge connection; an end of the locking buckle 53 is configured to be corresponsive to the push button 55; and a second bearing 57 is installed between the locking buckle 53 and the connection base 54, and configured to be corresponsive to the fourth shaft 33. The quick release structure can remove the rotary brush body 34 quickly, and the removal is very convenient. During the removal, the push button 55 is pushed, so that the locking buckle 53 is separated from the interior of the push button 55 in order to remove the fourth shaft 33.

Figure 5:
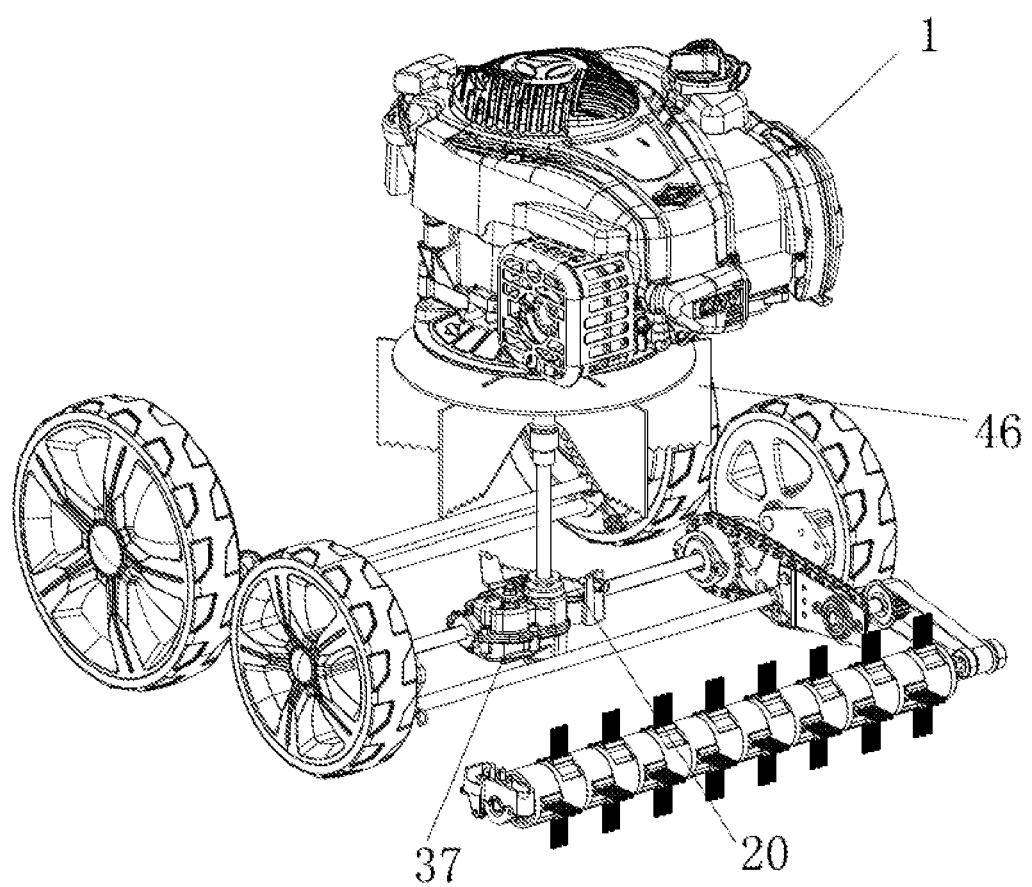
FIG. 5 is a schematic view showing the internal structure of a blowing-suction machine of this disclosure.
Figure 6:
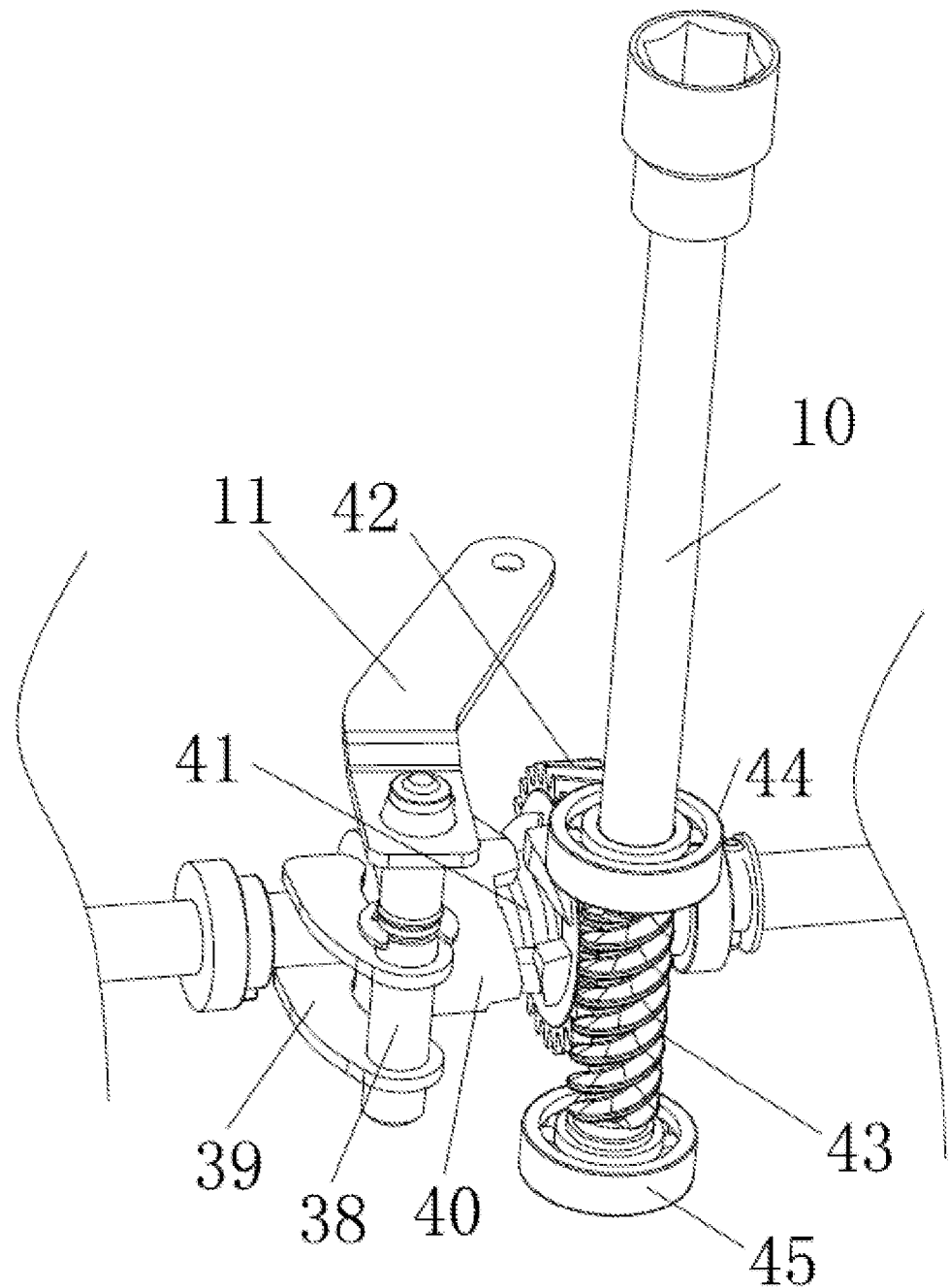
FIG. 6 is a schematic view showing the internal structure of a transmission gearbox of this disclosure.
Figure 7:
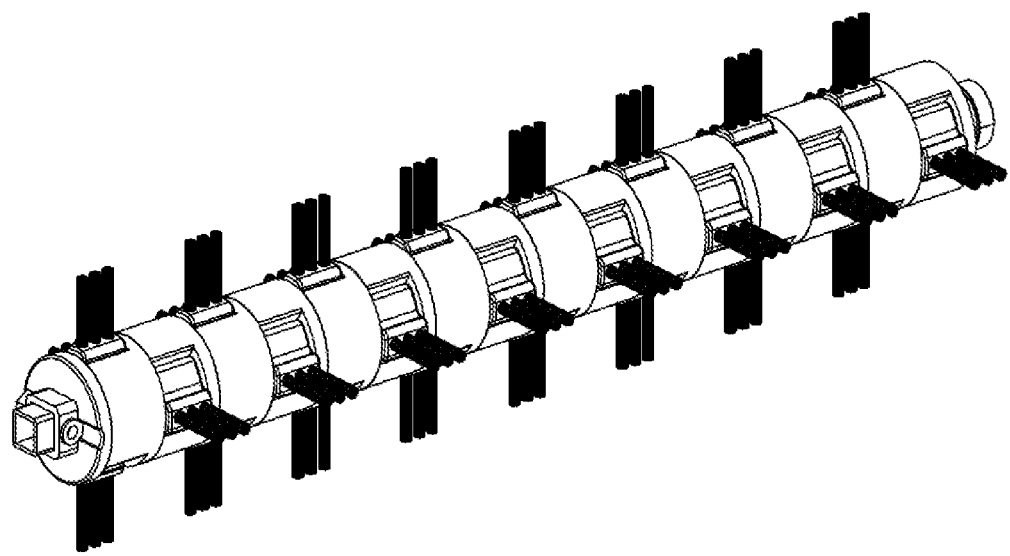
FIG. 7 is a schematic view of a rotary brush body of this disclosure.
Figure 8:
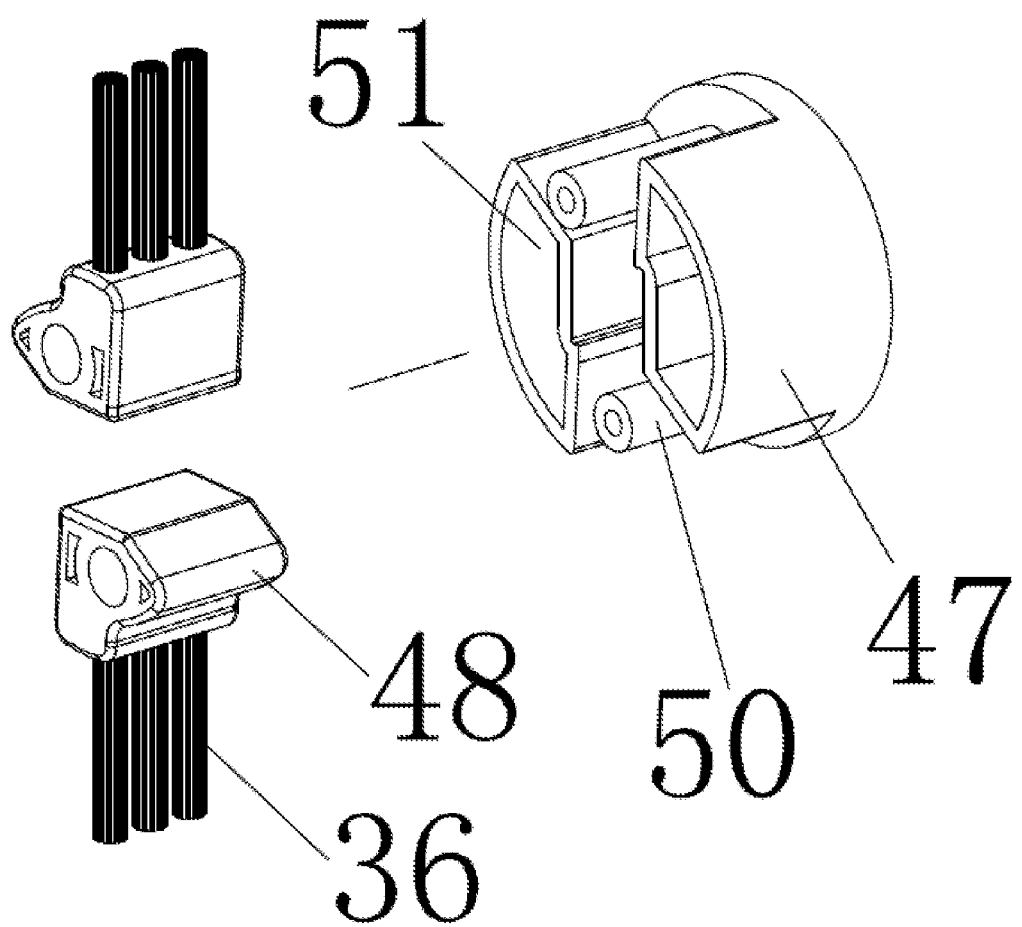
FIG. 8 is an exploded view of a brush device of this disclosure.
Figure 9:
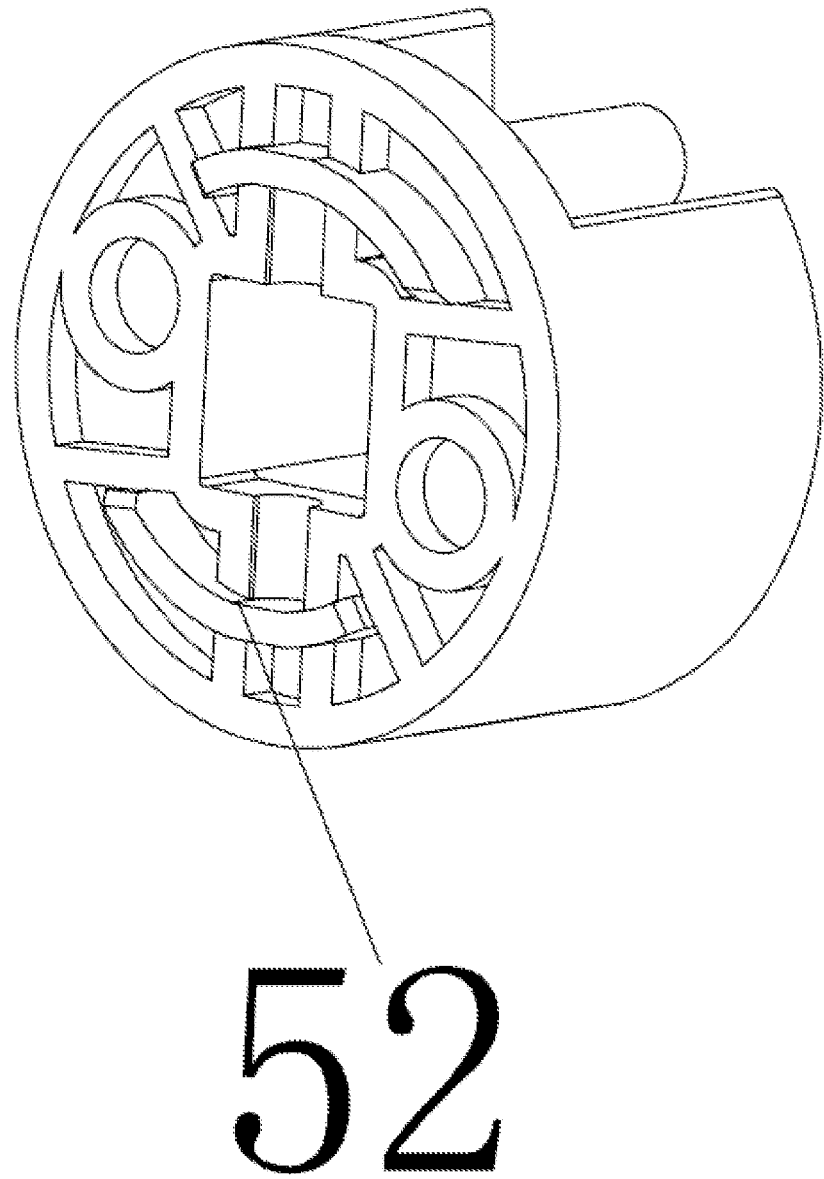
FIG. 9 is a schematic view showing the structure of a fixed seat of this disclosure.

In FIGS. 5 and 6, the transmission gearbox 12 comprises a housing 37, a fifth shaft 38, a turning plate 39, a rotating seat 40, a restoring spring 41 and a second gear 42, and a lower end of the trigger 11 is fixed to the fifth shaft 38, and the turning plate 39 is fixed to the fifth shaft 38, and the other end of the turning plate 39 is attached to the rotating seat 40, and the restoring spring 41 is installed to the sixth shaft 13, and the restoring spring 41 has an end attached to the second gear 42 and the other end configured to be corresponsive to the rotating seat 40, and the rotating seat 40 and the sixth shaft 13 are fixed and rotated synchronously; the second gear 42 is configured with a gap corresponsive to the sixth shaft 13; a lower end of the first shaft 10 has a helical teeth portion 43, a first gear 44 and a second gear 45 disposed at both upper and lower ends of the helical teeth portion 43 respectively, and the helical teeth portion 43 is engaged with the second gear 42.

In FIG. 6, the vane 46 and the first shaft 10 are coaxially disposed at an upper end of the first shaft 10, and the vane 46 and the wheel self-propelled device is sealed and separated by a separator (not shown in the figure) in the volute 2.

In FIG. 10, the vane 46 has a plurality of saw teeth 58 disposed at a lower end of the vane 46 to achieve the effect of cutting and crushing the garbage.

When it is necessary to execute the wheel self-propelled and automatic sweeping functions during the operation of the machine, users simply pull the lift-up handle 21 to drive the trigger 11 to rotate, so that the rotating seat 40 and second gear 42 of the transmission gearbox 12 attached to each other can rotate synchronously, so as to drive first wheel 6 and second wheel 7 to rotate by the first belt 15. In the meantime, the conveyance of the chain 26 and the second belt 31 drives the rotary brush body 34 to rotate, so as to achieve the self-propelled effect of the wheel and the automatic sweeping function of the brush 36. The steel wire 49 combs a lawn and separate garbage such as the dead leaves tangled in a bush, so that the garbage including the dead leaves is passed through the vacuum pipe 4 and sucked to the interior of the vane 46 before cutting or crushing the garbage. After the garbage is crushed, it enters into the deposit box 5. The structural design of this disclosure is very clever and capable of achieving the self-propelled effect and the automatic sweeping function. The application is very convenient and capable of reducing the degree of fatigue of the manual operation. In the meantime, the automatic sweeping function can separate the garbage attached on the ground, the wet leaves attached to the ground. The automatic combing function can comb the garbage including the dead leaves tangled deeply with the bush. The internal garbage crushing function thoroughly crushes the garbage with a larger surface and improves the collection efficiency of the collection bag. The vacuum pipe 4 can suck the garbage scattered in corners, ditches, flowers, or any place where other machines cannot reach. The machine of this disclosure has a powerful blowing-suction performance, and the suction function of the vacuum pipe 4 may be switched to the blowing function to blow and collect the garbage scattered in fragmented areas, and such function is integrated with the vent, so that the garbage may be sucked into the vent and passed through an air passage, and finally inputted into the garbage deposit box 5. The application is very convenient.

While this disclosure has been described by means of specific embodiments, numerous modifications and variations could be made thereto by those skilled in the art without departing from the scope and spirit of the invention set forth in the claims.

What is claimed is:
1. A blowing-suction machine, comprising: an engine (1), a volute (2), a vent assembly (3) and a vacuum pipe (4), characterized in that the engine (1) is installed at an upper end of the volute (2); the vent assembly (3) is installed at a front end of the volute (2); an output shaft of the engine (1) in the volute (2) is coupled to a vane (46), and a first shaft (10) of a self-propelled device is coupled to a lower end of the vane 46; the vacuum pipe (4) has an end coupled to the vent assembly (3) and the other end disposed in front of a garbage deposit box (5); a first wheel (6) is positioned offset vertically and horizontally from a first side of a rear end of the volute (2) and a second wheel (7) is positioned offset vertically and horizontally from an opposed second side of the rear end of the volute (2), and a third wheel (8) is positioned offset vertically and horizontally from a first side of a front end of the volute (2) and a fourth wheel (9) is positioned offset vertically and horizontally from an opposed second side of the front end of the volute (2); a wheel self-propelled device comprises the first shaft (10), a trigger (11), a transmission gearbox (12), a second shaft (13) configured to be rotatably driven by the transmission gearbox (12), a first pulley (14), a first belt (15), a second pulley (16), two first connecting plates (17), a second shaft (18) and a first connecting rod (19), wherein a shaft of the engine (1) is coupled to the first shaft (10); the trigger (11) has an end coupled to a lift-up handle (21) through a steel wire (20) and the other end coupled to the transmission gearbox (12); a first nd of the second shaft (13) driven by the transmission gearbox (12) is fixed to the first pulley (14) and an opposed second end thereof is coupled to a rolling-sweeping-combing device; the first belt (15) engages the first pulley (14) and the second pulley (16) for synchronous rotation by extending around and between the first pulley (14) and the second pulley (16); an end of one of the two first connecting plates (17) is rotatably coupled to the first wheel (6) and an end of the other of the two first connecting plates (17) is rotatably coupled to the second wheel (7); the first connecting rod (19) is fixed and coupled to the two first connecting plates (17); the second pulley (16) and the second shaft (18) are rotated synchronously; each end of the third shaft (18) passing through a corresponding one of the two first connecting plates (17) is fixed to a first gear (22) and a first bearing (23) respectively, and the first gear (22) of a first end of the second shaft (18) is engaged with an inner gear (24) installed in the first wheel (6) and the first gear (22) of an opposed second end of the second shaft (18) is engaged with an inner gear (24) installed in the second wheel (7).

2. The blowing-suction machine of claim 1, wherein the rolling-sweeping-combing device comprises a first chain wheel (25), a chain (26), two second connecting plates (27), a second chain wheel (28), a fourth shaft (29), a third pulley (30), a second belt (31), a fourth pulley (32), a fifth shaft (33), a rotary brush body (34) and a second connecting rod (35); an end of one of the two second connecting plates (27) is rotatably coupled to the third wheel (8) and an end of the other of the two second connecting plates (27) is rotatably coupled to the fourth wheel (9); the second connecting rod (35) is fixed and coupled to the two second connecting plates (27); the opposed second end of the shaft (13) driven by the transmission gearbox (12) is fixed to the first chain wheel (25); the chain (26) has an end coupled to the first chain wheel (25) and the other end coupled to the fourth chain wheel (28); the third shaft (29) has an end fixed to the second chain wheel (28) and the other end fixed to the third pulley (30); the second belt (31) engages the third pulley (30) and the fourth pulley (32) for synchronous rotation by extending around and between the third pulley (30) and the fourth pulley (32); the fourth shaft (33) has an end fixed to the fifth pulley (32) and the other end fixed to the rotary brush body (34); both ends of the fifth shaft (33) are rotatably coupled to the vent assembly (3), so that the rotary brush body (34) can rotate in the vent assembly (3).

3. The blowing-suction machine of claim 2, wherein the rotary brush body (34) comprises a plurality of brush devices installed onto the fourth shaft (33) in a mutual coordination manner, and the brush device comprises a fixed seat (47), a brush seat (48) and a brush (36), and the brush (36) is fixed onto the brush seat (48), and the brush seat (48) is plugged into a guide post (50) of the fixed seat (47), and a groove (51) is formed on a side of the fixed seat (47) and a projection (52) is disposed on the other side of the fixed seat (47) and configured to be corresponsive to the groove (51).

4. The blowing-suction machine of claim 2, wherein the rotary brush body (34) comprises a plurality of brush devices installed onto the fifth shaft (33) in a mutual coordination manner, and the brush device comprises a fixed seat (47) and a second steel wire (49), and the second steel wire (49) is inserted into the guide post (50) of the fixed seat (47), and a groove (51) is formed on a side of the fixed seat (47) and a projection (52) is disposed on the other side of the fixed seat (47) and configured to engage with the groove (51).

5. The blowing-suction machine of claim 2, wherein the fifth shaft (33) further has a quick release structure disposed on a side of the fifth shaft (33), and the quick release structure comprises a locking buckle (53), a connection base (54), a push button (55) and a torsion spring (56); an upper end of the connection base (54) is fixed to the vent assembly (3), and the locking buckle (53) is hinged and installed to the connection base (54), and the push button (55) and the torsion spring (56) are installed to the other end of the connection base (54) by a hinged connection; an end of the locking buckle (53) is configured to be engaged by the push button (55); and a second bearing (57) is installed between the locking buckle (53) and the connection base (54), and configured to support and end of the fifth shaft (33).

6. The blowing-suction machine of claim 1, wherein the transmission gearbox (12) comprises a housing (37), a sixth shaft (38), a turning plate (39), a rotating seat (40), a restoring spring (41) and a second gear (42), and a lower end of the trigger (11) is fixed to the sixth shaft (38), and the turning plate (39) is fixed to the sixth shaft (38), and the other end of the turning plate (39) is attached to the rotating seat (40), and the restoring spring (41) is installed to the second shaft (13), and the restoring spring (41) has one end attached to the second gear (42) and the other end engaging the rotating seat (40), and the rotating seat (40) and the second shaft (13) are fixed and rotated synchronously; the second gear (42) is positioned adjacent to the second shaft (13); a lower end of the first shaft (10) has a helical teeth portion (43), a third gear (44) and the second gear (45) disposed at upper and lower ends of the helical teeth portion (43) respectively, and the helical teeth portion (43) is engaged with the second gear (42).

7. The blowing-suction machine of claim 1, wherein the vane (46) and the first shaft (10) are coaxially disposed at an upper end of the first shaft (10), and the vane (46) and the wheel self-propelled device is sealed and separated by a separator.

8. The blowing-suction machine of claim 1, wherein the vane (46) has a plurality of saw teeth (58) disposed at a lower end of the vane (46).

* * * * *